Dec. 26, 1967   H. J. STRAUBE   3,360,664
ELECTROMECHANICAL APPARATUS
Filed Oct. 30, 1964   3 Sheets-Sheet 1

INVENTOR.
HELMUT J. STRAUBE
BY Samuel R. Genca
AGENT

Dec. 26, 1967  H. J. STRAUBE  3,360,664

ELECTROMECHANICAL APPARATUS

Filed Oct. 30, 1964  3 Sheets-Sheet 2

INVENTOR.
HELMUT J. STRAUBE

BY Samuel R. Genca
AGENT

Dec. 26, 1967     H. J. STRAUBE     3,360,664
ELECTROMECHANICAL APPARATUS
Filed Oct. 30, 1964     3 Sheets-Sheet 3
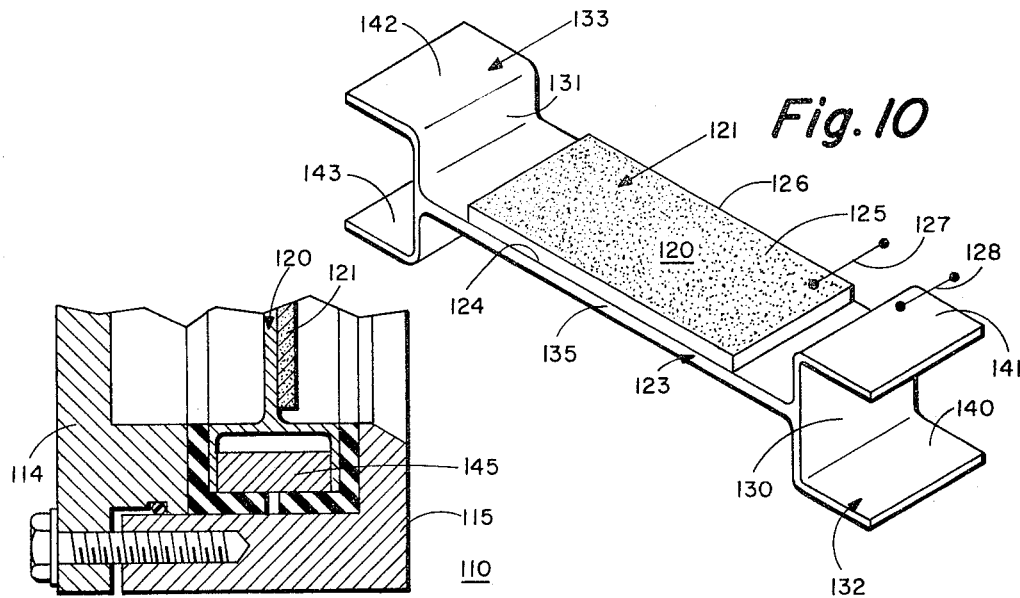
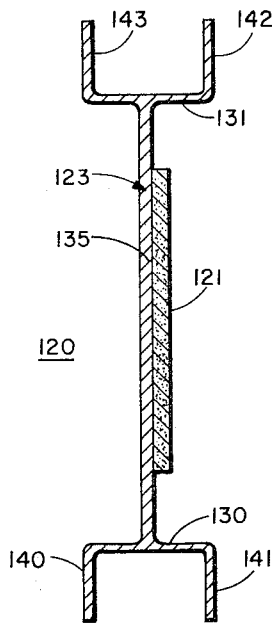
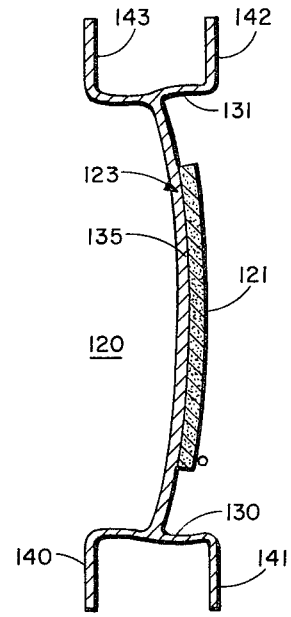
INVENTOR.
HELMUT J. STRAUBE
BY Samuel R. Genoa
AGENT

United States Patent Office 3,360,664
Patented Dec. 26, 1967

3,360,664
ELECTROMECHANICAL APPARATUS
Helmut J. Straube, Webster, N.Y., assignor to General
Dynamics Corporation, a corporation of Delaware
Filed Oct. 30, 1964, Ser. No. 407,685
7 Claims. (Cl. 310—8.2)

The present invention relates to electromechanical transducer apparatus and more particularly to an improved acoustic radiating means for transducers.

Although the present invention is suited for more general applications, it is particularly adapted for transducers such as sonar sound projectors of the bender type. A transducer of the bender type includes a pair of spaced active components in the form of juxtaposed piezoelectric ceramic disks or plates mounted so as to undergo flexure when subjected to acoustic energy. This flexure gives rise to an electrical voltage between electrodes on opposite faces of each disk, which voltage is representative of the acoustic energy impinging upon the disk. The transducer may also be used as a projector for converting alternating electrical energy into compressional wave energy or acoustical energy. The ceramic disks generate acoustic energy by bending in response to an applied electrical signal voltage.

One of the outstanding problems in such transducers is the objectionable loss of energy at the periphery of the radiating element or disk. This problem is generally due to the mounting of the disk in a slidable or yielding mount such as rubber, which allows the disk to slide radially while it vibrates in a flexural mode. Such mounts are lossy and sometimes permit the disk or radiating element to chatter and move in a piston-like fashion instead of in a flexural mode of vibration.

Accordingly, it is an object of this invention to provide a low-loss means for mounting a radiating element in a transducer.

It is another object of the present invention to provide an improved electromechanical transducer.

It is still another object of the present invention to provide an electromechanical transducer with improved acoustic radiating means.

It is still another object of the present invention to provide an improved transducer for converting mechanical forces into an electrical output.

It is yet another object of the present invention to provide an improved transducer which is capable of operating at great depths under water.

Another object of the present invention is to provide an improved sound source for use in either air or water.

Briefly, in accordance with the general aspects of the invention, an improved transducer is provided for converting varying axially directed mechanical forces or pressure variations to correspondingly varying changes in electrical quantities and to change varying electrical quantities applied thereto into correspondingly axially directed mechanical forces. The transducer converts the mechanical or electrical forces through bender type elements such as piezoelectric or electrostrictive elements which vibrate in a flexural mode of vibration. This invention is particularly concerned with supporting structure for such bender type units. The supporting structure in accordance with the invention comprises a flexural vibrating element of elastic material having a stationary rim portion, a driven radiating portion fixed to the piezoelectric elements and a hinge portion interconnecting the stationary rim portion to the radiating portion. The fixed rim portion offers a high impedance to both radial and axial movement of the radiating portion, while the flexible hinge portion offers relatively low impedance to flexure of the radiating portion and the piezoelectric elements attached thereto. The driven radiating portion is symmetrical so that a uniform flexure and stress level is achieved on opposite faces of the driven radiating portion and the hinge portion when the driven radiating portion is excited into vibrations.

Other objects and features of this invention will become more apparent to those skilled in the art, by referring to the specific embodiments described in the following specification and shown in the accompanying drawings in which:

FIG. 10 is a perspective view of a rectangular laminar transducing unit in accordance with the invention;

FIG. 11 is a fragmentary side view in section showing in detail a transducer which includes the laminar transducing unit of FIG. 10;

FIG. 12 is a side view of the laminar transducing unit of FIG. 10 in a rest or neutral position; and FIG. 13 is a side view like FIG. 12 showing the laminar transducing unit of FIG. 12 in a position assumed during the vibration in a flexural mode.

Figure 1:
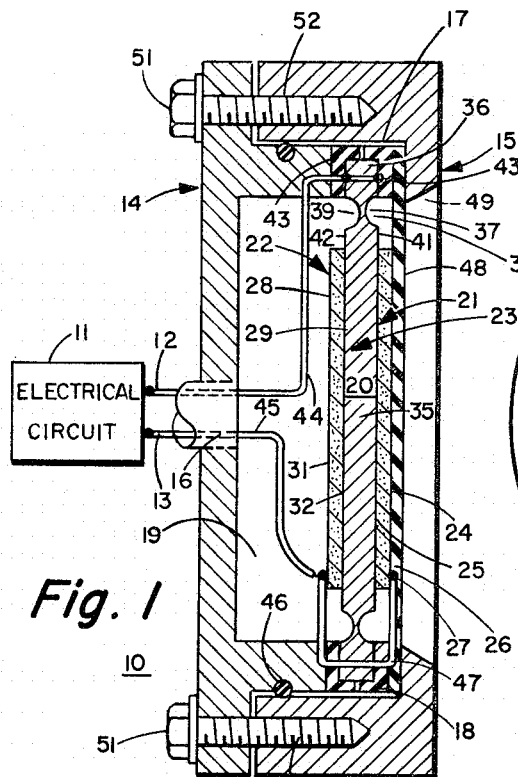
FIG. 1 is a central cross-sectional view of an electromechanical transducer apparatus in accordance with the invention.

Referring first to FIGS. 1 to 6 and more particularly FIG. 1, an electromechanical transducer 10 is shown coupled to an electric circuit 11 at terminals 12 and 13. The transducer 10 comprises a laminar transducing unit 20, a watertight casing or housing 14, and a ring member 15 for securing the laminar transducing unit 20 within the housing 14.

The laminar transducing unit 20 includes active elements such as first and second piezoelectric ceramic disks 21 and 22 respectively and a flexural vibrating element 23 coupled to the piezoelectric disks 21 and 22. The flexural vibrating element 23 is shown more in detail in FIGS. 2 to 6. The active elements may be magnetostrictive or electrostrictive elements without departing from the invention. The active elements for illustrative purposes are first and second piezoelectric ceramic disks 21 and 22 of a polarizable ferroelectric ceramic material which may be, for example, barium titanate and solid solutions of lead zirconate and lead titanate. When polarized by the application of a strong electrostatic field, these ceramic disks 21 and 22 have properties corresponding to the piezoelectric effect of crystalline material such as quartz and Rochelle salt.

The first piezoelectric ceramic disk 21 includes first and second opposite principal surfaces 24 and 25 respectively. The first and second principal surfaces 24 and 25 are coated within electrically conducting material to form an outer first electrode 26 and an inner first electrode 27. The second piezoelectric ceramic disk 22 includes third and fourth outside principal surfaces 28 and 29 respectively. The third and fourth principal surfaces 28 and 29 are also coated with an electrically conducting material to form an outer second electrode 31 and an inner second electrode 32. Although coated electrodes of an electrically conducting material are shown, other types of flexible electrodes, such as copper foil or mesh, may be used for applying an electrical field across the first and second piezoelectric ceramic disks 21 and 22 in a manner well known to those skilled in the art. In some cases the inner electrodes may be omitted since the flexural vibrating element 23 serves as the inner electrode for both disks 21 and 22 when it is made of an electrically conducting material. The first and second piezoelectric ceramic disks 21 and 22 are polarized normal to the principal surfaces 24, 25, 28 and 29 respectively, as shown by arrows in FIG. 3, so that a voltage or potential applied to the electrodes 26 and 27 changes the radial dimensions of the piezoelectric ceramic disks 21. In a like manner, a voltage applied to the electrodes 31 and 32 changes the radial dimensions of the piezoelectric ceramic disk 22. The first and second piezoelectric ceramic disks 21 and 22. may be made to contract or expand selectively by applying a biasing voltage there across at electrodes 26, 27 and 31, 32 respectively and applying a signal voltage which varies about the biasing voltage.

Figure 2:
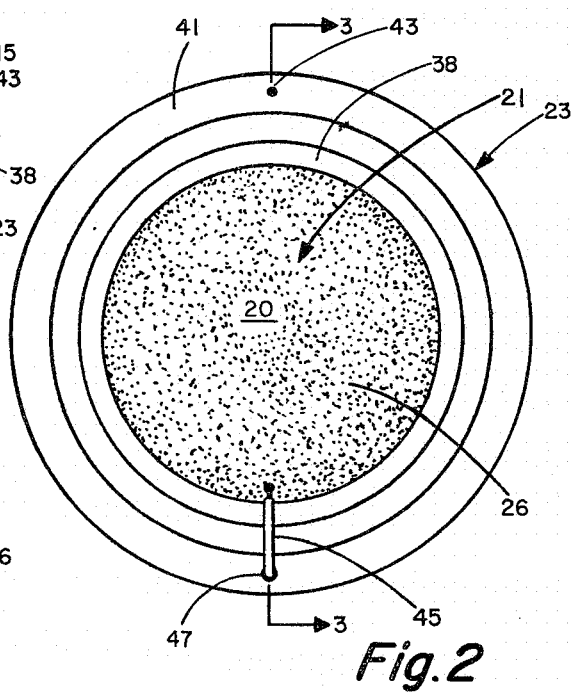
FIG. 2 is a front view of a laminar transducing unit of the electromechanical transducer of FIG. 1.

The flexural vibrating element 23, in accordance with the invention, includes a driven radiating portion 35, a peripheral or rim portion 36 and a hinge portion 37 defined by two similar coaxial grooves 38 and 39 disposed in a back-to-back relationship on the major faces 41 and 42 respectively of the flexural radiating element 23. The coaxial grooves 38 and 39 are of equal depth and encompass the discoid driven radiating portion 35, as illustrated in FIG. 2. The flexural vibrating element 23 is made of an elastic resilient material such as steel, Phosphor bronze or the like.

The hinge portion 37 is decoupled from the major faces 41 and 42 of the flexural vibrating element and lies on both sides of the neutral axis or neutral plane of the structural vibrating element 23. The neutral plane of the flexural vibrating element 23 is that plane which does not substantially change its radial dimensions during flexure of the driven radiating portion 35. The neutral plane contains a neutral axis and is perpendicular to the direction of flexure. Stated in another way, the intersection of the cross section of the flexural radiating element and the neutral plane of the flexural radiating element 23, defines a neutral axis. The grooves 38 and 39 are symmetrical with regards to the location of the neutral plane or zero stress plane.

The hinge portion 37 is relatively compliant to lateral movement of the major faces 41 and 42, or to the flexure of the driven radiating portion 35. The hinge portion 37 however, is substantially rigid for end thrust or piston-like movement of the radiating portion 35. The hinge portion 37 provides an improved edge support for the radiating portion 35. The flexural vibrating element 23 eliminates the need for sliding seals since the flexural vibrating element 23 is fixed at the driven rim portion 36 and is immovable thereat, but the driven radiating portion 35 can be excited into flexural vibrations about the hinge portion 37.

The flexural mode of vibration of the driven radiating portion 35 is characterized by the axial displacement of the driven radiating portion 35 which starts at the hinge portion 37 which may be considered a nodal circle and reaches a maximum or antinode at the center of the driven radiating portion 35. The manner in which the driven radiating portion 35 bends or flexes is shown more in detail in FIGS. 3–5 and will be explained with the operation of the transducer 10. Since the bending moment of the drive radiating portion 35 is greatest at the center of the radiating portion 35 and the hinge portion 37 is a nodal circle, the hinge portion 37 can be made thinner than the driven radiating portion 35 without increasing its stress level. The hinge portion 37 is a principal factor in determining the operating depth of the transducer 10 in water, and it is also a determinate factor on the resonant frequency of the radiating portion 35. The driven radiating portion 35 may be made quite thin to provide negligible impedance to flexure of the driven radiating portion 35 and yet be still strong enough to withstand a high level of ambient hydrostatic operating pressure of the transducer 10. The resonant frequency of the driven radiating portion 35 can be increased or decreased by varying the thickness of the hinge portion 37 and by varying the diameter of the coaxial grooves 38 and 39. The resonant frequency of the driven radiating portion 35 of course is also a function of the thickness and diameter of the radiating portion 35.

The first and second piezoelectric ceramic disks 21 and 22 are fastened to the driven radiating portion 35 by a suitable adhesive or cement, such as one of the epoxy adhesives or cements, for example, Epon adhesive No. 944 made by Shell Chemical Company. The inner first and second electrodes 32 and 27 are contiguous to the radiating portion 35. The adhesive or cement which fastens the piezoelectric ceramic disks 21 and 22 to the radiating portion 35 is preferably a very thin film in the order of a few thousandths of an inch so that little power will be lost to the adhesive when the radiating portion 35 is vibrated. The adhesive is also made purposely thin so that the inner electrode 27 and 28 are in contact with the flexural vibrating element 23 so that it may serve as a common conductor. A lead wire 44 is connected to the rim portion 36 at 43 as by soldering or welding. Another lead wire 45 is connected in parallel to the outer first and second electrodes 26 and 31 of the first and second piezoelectric ceramic disks 21 and 22 respectively through an insulated hole 47 in the rim portion 36. The lead wires 44 and 45 are connected to terminals 12 and 13 respectively, so that the biasing voltage and the electrical signal voltage from the electric circuit 31 can be conducted to the outer and inner electrodes of the first and second piezoelectric ceramic disk as shown in FIGS. 1–5. The lead wires 44 and 45 can also conduct a voltage generated across the first and second piezoelectric ceramic disks 21 and 22 when they are vibrated by a mechanical force or a fluid pressure.

The laminar transducing unit 20 is clamped within the housing 14 in an annular groove 17 formed by a variable space between the housing 14 and the retaining ring member 15. The rim portion 36 is fixed within the groove 17. Also disposed in the annular groove 17 and around the rim portion 36 is a hard electrical insulating split ring member 18 which electrically insulates the laminar transducing unit 20 from the housing 14 and the retaining ring member 15. The split ring member 18 is made of a hard electrical insulating material which is relatively non-compliant to axial and radial movement of the rim portion 36.

The housing 14 is made of a hard, rigid, material such as steel, fiberglass, plastic, or the like, and includes a cavity 19. A fiberglass housing 14 or other electrical insulating material may eliminate the need for the split ring member 18. The cavity 19 may be filled with a pressure release material such as air or gas. The cavity 19 can also contain an electrical amplifier or preamplifier therein. The housing 14 includes a watertight joint, not shown, at 16. The watertight joint 16 forms no part of this invention and may be any one of the well-known watertight joints for sub-aqua hydrophones and transducers. An "O" ring 46 provides a watertight seal between the housing 14 and the ring member 15.

A flexible diaphragm 48 such as rubber covers the laminar transducing unit 20 and provides a fluid seal for the housing 14 at the groove 17. The ring member 15 includes an opening 49 which is slightly greater than the diameter of the radiating portion 35 of the flexural vibrating element 23. A series of bolts 51 threaded in holes 52 of the housing 14 draw the ring member 15 towards the housing 14 and clamps the laminar transducing unit 20, the split ring member 22 and diaphragm 48 within the groove 17.

Figures 3, 4, 5, 6:
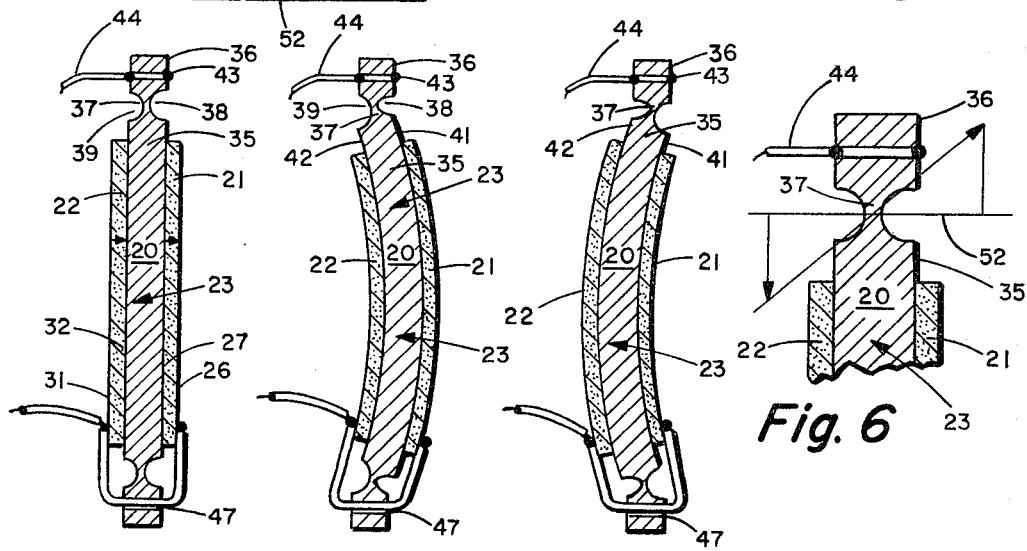
FIG. 3 is a view of the laminar transducing unit of FIG. 2 in cross-section taken along a diametrical plane along the line 3—3 of FIG. 2 with the unit in a rest or neutral position.
FIGS. 4 and 5 are views similar to FIG. 3 of the laminar transducing unit of FIG. 2 in a flexural mode of vibration on opposite sides of the rest or neutral position, respectively.
FIG. 6 is a fragmentary cross-sectional side view of the laminar transducing unit of FIG. 2, illustrating equal stress levels within the laminar transducing unit when vibrated in a flexural mode as in FIGS. 4 and 5.

During the operation of the transducer 10, acoustic pressures are transmitted through the diaphragm 48 to the laminar transducing unit 20 and exert fluctuating mechanical forces on the laminar transducing unit 20. These forces are predominantly axial on the laminar transducing unit 20 and are substantially uniformly distributed so that the laminar transducing unit 20 flexes or dishes as a diaphragm. The diaphragm action is characterized by a flexural mode of vibration or concave-convex flexure wherein there is relatively no displacement at the nodal circle which occurs at the hinge portion 37 and a maximum displacement at the anti-node which occurs at the center of the flexural vibrating element 35, as indicated in FIGS. 4 and 5. Each of the first and second piezoelectric disks 21 and 22 on the radiating portion 35 manifest a dish-like distortion when vibrated in a flexural mode of vibration.

The first and second piezoelectric disks 21 and 22 in consequence to the distortion each produce a voltage across their electrodes 26, 27 and 31, 32, respectively, which voltages are additive algebraically when connected as in FIG. 1 to produce an electrical output signal. The electrical output signal is representative of the acoustic energy impinging upon the transducer 10.

When the transducer 10 is used as a projector, an electrical input signal voltage from the electric circuit 10 is applied to terminals 12 and 13. Strains are developed in the first and second piezoelectric ceramic disks 21 and 22. The strains on the first and second piezoelectric ceramic disks 21 and 22 cause the radial dimensions to change in proportion to the applied input signal voltage. These radial changes are manifested in expansion and contraction along the principal surfaces of the first and second piezoelectric ceramic disks 21 and 22.

Because the radial strains in the first and second piezoelectric ceramic disks 21 and 22 are in opposite directions, the laminar transducing unit 20 bends in a flexural mode of vibration as illustrated in an exaggerated form in FIGS. 4 and 5. The rim portion 36 remains clamped or fixed within the groove 17, while the hinge portion 37 flexes or yields to flexure of the driven radiating portion 35. Since the flexural vibrating element 23 is made of an elastic resilient material, it has a natural resonant frequency so that very little power is required to drive the laminar transducing unit 20 when it is vibrated at or near its natural or resonant frequency. The laminar transducing unit 20 is fixed within the groove 17. Spurious movement or chatter of the transducing unit 20 is prevented by clamping the laminar transducing unit 20 within the groove 17. The hinge portion 37 is radially compliant to dynamic forces but is radially stiff to static forces.

Figure 7:
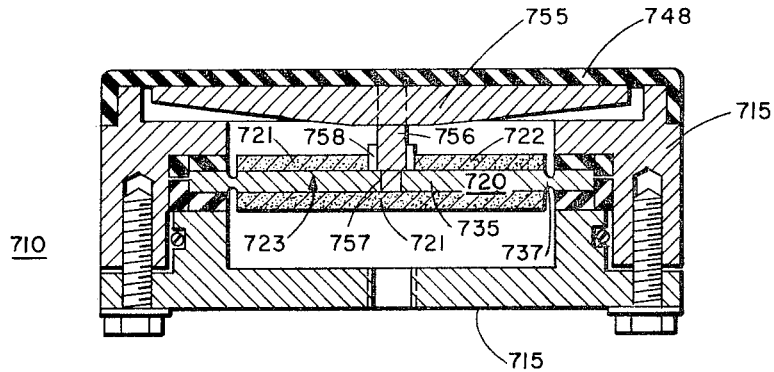
FIG. 7 is a central cross-sectional view showing a piston radiating coupler connected to a laminar transducing unit of an electromechanical transducer in accordance with the invention.

Referring now to FIG. 7, there is illustrated another electromechanical transducer 710 in accordance with the invention. Elements of the electromechanical transducer 710 of FIG. 7, corresponding to those of FIG. 1, are indicated by the same reference numeral, plus 700. The electromechanical transducer 710 differs from the electromechanical transducer 10 of FIG. 1, in that a radiating piston coupler 755 is connected to a laminar transducing unit 720. The piston coupler 755 includes a shank portion 756 disposed in a hole 757 in a driven radiating portion 735 of a flexural vibrating element 723. The shank portion 756 may be fastened in the hole 757 by copper brazing or welding or other well known techniques. The shank portion 756 is insulated from the first piezoelectric ceramic disk 721 by an insulating sleeve 758. The insulating sleeve 758 may be of a phenolic material or any other hard electrical insulating material. A diaphragm 748 extends across the piston coupler 755 and is molded to the housing 715 in a manner well known to those skilled in the art.

In the operation of the electromechanical transducer 710, acoustic pressure is transmitted through the diaphragm 748 to the piston coupler 755. The piston coupler 755 in response to the acoustic pressure moves axially and transmits the fluid pressure variations to the laminar transducing element 720. The transducing element 720 in response to the axial forces applied thereon bends and flexes in a manner similar to the laminar transducing unit 20 of FIG. 1. However, since all the forces are concentrated at the center of the laminar transducing unit 720, the displacement of the center of the radiating portion 735 is greater than the displacement of the radiating portion 35 of transducer 10. Since the piston coupler 755 moves axially in a piston-like manner and the mechanical forces are concentrated at one point, the laminar transducing unit 720 is somewhat more sensitive to acoustic pressure than the laminar transducing unit 20 of transducer 10. The hinge portion 737 constrains the laminar transducing unit 720 in the axial direction so that the radiating portion 735 is forced into a flexural mode vibration as previously described for the laminar transducing unit 20 of FIG. 1.

When the electromechanical transducer 710 is used as a projector, an electrical input signal voltage applied across the first and second piezoelectric ceramic disks 721 and 722 induces a strain within the first and second piezoelectric ceramic disks 721 and 722 which is accompanied by a flexure of the laminar transducing unit 720. The flexure of the laminar transducing unit 20 is translated into axial forces at the piston coupler 755. Thus, the electromechanical transducer 710 features transformation of a flexural mode vibration to piston-like vibrations at the piston coupler 755. This is particularly advantageous because the piston coupler 755 moves in a piston-like manner when vibrated instead of a flexural mode of vibration.

Figure 8:
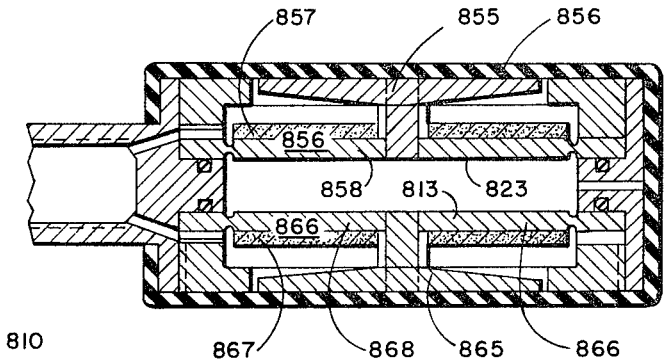
FIG. 8 is a central cross-sectional view showing a plurality of laminar transducing units and piston radiating couplers in a back-to-back relationship to couple out energy on both sides of the transducer, all in accordance with the invention.

In FIG. 8 there is shown an electromechanical transducer 810, which is like the electromechanical transducer 710 of FIG. 7, except that two radiating piston couplers 855 and 865 are attached to two laminar transducing units 856 and 866 respectively. The electromechanical transducer 810 provides for the radiation of acoustic energy from two opposite faces of the transducer 810. The electromechanical transducer 810 includes the laminar transducing units 856 and 866 which are similar to the laminar transducing unit 720 of FIG. 7, except that piezoelectric ceramic disks 857 and 867 are cemented to only one of the sides of the flexural vibrating elements 858 and 868 of the laminar transducing units 856 and 866. The reason for employing only one piezoelectric ceramic disk 857 on the flexural vibrating element 858 is that the piezoelectric ceramic disks can withstand higher compressional forces than tensional forces. By employing only one ceramic disk 857 on flexural vibrating element 858 and one ceramic disk 867 on flexural vibrating element 868, then, in a static compressional condition, the transducer 10 can withstand higher hydrostatic pressures than if two piezoelectric ceramic disks were used on each side of the flexural vibrating elements 856 and 866. This is also true for the laminar transducing unit of FIG. 10 and will be described in more detail hereinafter.

The electromechanical transducer 810 operates in a manner similar to the electromechanical transducer 710. However, the two radiating pistons move in diametrically-opposite directions at the same time so that acoustic energy is generated from both sides of the transducer 810. The piezoelectric ceramic disks 857 and 867 drive the flexural vibrating elements 856 and 866 by contracting and expanding radially in response to an electrical signal voltage applied thereacross. Since the flexural vibrating elements 858 and 868 are rigid and non-polarized, the flexural vibrating elements 858 and 868 are forced to vibrate in a flexural mode by the piezoelectric disks 857 and 868 in response to the electrical signals applied across the piezoelectric ceramic disks 857 and 867, as was previously described for the transducer 10 of FIG. 1.

Figure 9:
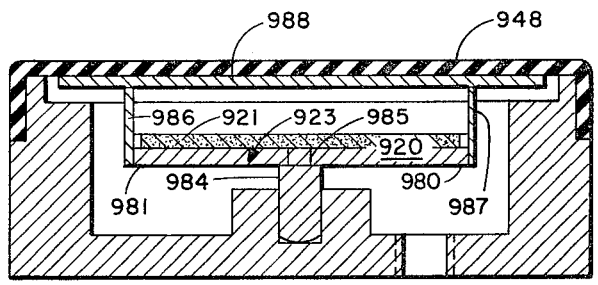
FIG. 9 is a central cross-sectional view showing a laminar transducing unit which is fixed at its center and is vibrated in a flexural mode about its center, all in accordance with the invention.

FIG. 9 is another embodiment of the invention illustrating a laminar transducing element 920 clamped to a post 984 and to a plate 988 through connecting rods 986 and 987. The laminar transducing unit 920 includes a flexural vibrating element 923 and a piezoelectric disk 921. The post 984 is fixed within a hole 985 in the flexural vibrating element 923. The flexural vibrating element 923 vibrates about the post 984 in a flexural mode of vibration. The point at which the flexural vibrating element 923 is fixed to the post 985 is a node while the ends 980 and 981 of the flexural vibrating element are the antinodes. The connecting rods 986 and 987 connect the ends 980 and 981 respectively to the plate 988. A housing 914 and a rubber diaphragm 948 waterproof the laminar transducing unit 920.

The electromechanical transducer 910 differs from the electromechanical transducers of FIGS. 1 through 8 in that the flexural vibrating element 923 and the piezoelectric ceramic disk 921 are fixed at post 985 while the ends 980 and 981 are free to vibrate. The reason for this feature is that the maximum displacement at the antinodes, ends 980 and 981, can be translated to the plate 988 by the connecting rods 986 and 987. Acoustic energy applied to the plate 988 may be translated in an axial direction to the laminar transducing unit 920 to bend and strain the piezoelectric ceramic disk 921 thereon radially in a flexural mode. In response to the induced strain within the piezoelectric disk 921, an electrical signal is generated by the piezoelectric disk 921. Conversely, acoustic energy may be generated by the transducer 910 when the piezoelectric ceramic disk 921 and the flexural vibrating element 923 are driven in a flexural mode of vibration by the application of an electrical input signal across the piezoelectric disk 921.

FIGS. 10 and 11 illustrates still another embodiment of the invention. Shown at 110 is a transducer comprising a laminar transducing unit 120, which includes a piezoelectric ceramic member 121 and flexural vibrating element 123. The piezoelectric ceramic member 121 is rectangular in shape and has one principal surface 124 cemented to the flexural vibrating element 123 in a manner similar to that described in FIG. 1. The piezoelectric ceramic member 121 includes an electrode 125 along another principal surface 126. The piezoelectric ceramic member 121 is polarized transversely to the longitudinal axis of the member 121 and normal to the principal surfaces 124 and 125. A lead wire 127 is connected to the electrode 125 as by soldering. Another lead wire 128 is connected to the flexural vibrating element 123.

The flexural vibrating element 123 is made of an elastic resilient material and includes hinge portions 130 and 131 connected to rim portions 132 and 133, and to a driven radiating portion 135. The piezoelectric ceramic member 121 is orientated in cooperative relationship with the driven radiating portion 135 so that a voltage applied across the piezoelectric ceramic member 121 tends to change the length of the piezoelectric ceramic member 121. However, the change of length of the piezoelectric ceramic member 121 is restrained by the driven radiating portion 135 which is firmly bonded to the piezoelectric ceramic member 121, so that the end result is a bending action of the piezoelectric ceramic member 121 and the driven radiating portion 135, motion occurring at right angles to the forced change in length. Due to the flexure in the piezoelectric ceramic member 921, a voltage is developed between electrodes 124 and 125, by direct piezoelectric action of member 121. Similarly, voltage applied to electrodes 124 and 125 results in a bending action in member 121 and the radiating portion 135, by the inverse piezoelectric action of member 121. The operation and the co-action between the piezoelectric ceramic member 121 and the flexural vibrating element 123 will be explained in more detail with FIGS. 12 and 13.

The rim portion 132 includes spaced-apart legs 140 and 141 connected to the hinge portion 130 substantially equidistant from the radiating portion 123. The other rim portion 133 includes similarly spaced apart legs 142 and 143, connected to the driven portion 131 substantially equidistant from the driven radiating portion 123. The rim portions 132 and 133 are stationary and fixed relative to the radiating portion 123. The hinge portions 130 and 131 are complaint to end movement of the flexural radiating portion 135 which movement occurs transversely to the hinge portions 130 and 131. The hinge portions 130 and 131 are stiff to movement of the driven radiating portion 135 along the hinge portions 130 and 131. The hinge portions 130 and 131 act like longitudinal springs which resiliently yield and offer a relatively low impedance to forces normal to the longitudinal axis of the spring, or hinge portions 130 and 132, but are stiff and offer a high impedance to forces applied parallel to the longitudinal axis thereof. Thus the driven radiating portion 135 and the piezoelectric ceramic member 121 may be vibrated in a flexural mode about the hinge portions 130 and 131, since there is a very low impedance vibration in that direction.

Referring to FIG. 11, the laminar transducing unit 120 is clamped within the housing 114 of the transducer 110. A retaining ring member 115 clamps the laminar transducing unit 120 in a manner similar to that shown in FIG. 1. A spacer bar 145 of metal or other similar hard material is disposed between legs 140 and 141 of rim portion 132 to keep a constant and suitable spacing between the legs 140 and 141. Although only one spacer bar 145 is shown it should be understood that another spacer bar not shown is disposed between legs 142 and 143.

The operation of the transducer 110 will be described in conjunction with FIGS. 12 and 13 which show the laminar transducing unit 120 in a neutral position and in an exaggerated flexural mode of vibration respectively. The operation of the transducer 110 will now be considered during the application of an electrical signal voltage of a given frequency to the piezoelectric ceramic member 121 through lead wires 127 and 128, from an electric circuit (not shown). The electrical signal voltage creates an electric field gradient between the principal surfaces 124 and 125 of the piezoelectric ceramic member 121. A property of the piezoelectric material in member 121 is that upon application of an electrical field to the material in a direction parallel to the direction of polarization of the piezoelectric material, a strain or physical deformation will occur parallel to the direction of the field. The strain takes the form of an expansion or contraction along the longitudinal axis of the member 121, depending upon the relative orientation of the electric field with respect to the direction of polarization.

When the electric field across the principal surfaces 124 and 125 alternates in different directions, the piezoelectric member 121 will alternately expand and contract at the frequency of the electric field. Stresses occurring periodically within the member 121 will produce strains in the radiating portion 135 which is coupled to the member 121 so that they will vibrate together in a flexural mode of vibration. When the radiating portion 135 and the piezoelectric member 121 are vibrated in the flexural mode, the hinge portions 130 and 131 flex as shown in FIG. 13, alternately, about the neutral position as shown in FIG. 12. The legs 140 and 141 of rim portion 132, and legs 142 and 143 of rim portion 133, are held stationary within the housing 114 (FIG. 13), while the radiating portion 135 and the hinge portions 130 and 131 vibrate in response to the electrical signal voltage applied to the piezoelectric ceramic member 121.

The transducer 110 can convert acoustic energy or mechanical energy into an electrical signal when the radiating portion 135 and the piezoelectric member 121 are vibrated. The inverse property of the piezoelectric material in the piezoelectric member 121 is that upon application of a stress thereto in a direction parallel to the direction of polarization of the piezoelectric material, a potential will appear in a direction parallel to the direction of application of the stress. The piezoelectric member 121 is alternately stressed in a direction effecting alternate compressions and extensions in response to acoustic energy impinging upon the laminar transducing unit 120. The hinge portions 130 and 131 in accordance with the invention present a high impedance to lateral movement of the radiating portion 135 and a low impedance to longitudinal or end movement of the radiating portion so that flexural vibrations are achieved in radiating portion 135.

From the foregoing description it will be apparent that there has been provided an improved transducer. Advantages of the transducer arise from the use of a novel radiating means which can couple acoustic energy to water or other fluid mediums and receive acoustic energy. While a plurality of embodiments of the invention have been described, variations in these embodiments, as well as other embodiments, within the scope of the invention, will undoubtedly become apparent to those skilled in the art. Accordingly, the foregoing description should be taken merely as illustrative and not in any limiting sense.

What is claimed is:
1. An electromechanical transducer comprising:
  (a) an element of elastic and resilient metal having a rigid peripheral portion, a driven radiating plate portion having a neutral axis about which flexure occurs and a hinge portion connected between said driven radiating plate portion and said peripheral portion along said neutral axis so that said driven radiating portion vibrates in a flexural mode,
  (b) said hinge portion being defined by a first groove on one side of said element and a second coaxial groove on the other side of said element in a back-to-back relationship with said first groove so that said hinge portion has a cross-sectional area which is less than the cross-sectional area of said driven radiating plate portion,
  (c) said hinge portion defines a nodal circle having a low impedance to flexure of said radiating portion and a high impedance to radial and axial movement of said driven radiating plate portion,
  (d) electromechanical translating means coupled to said driven radiating portion for vibrating said driven radiating plate portion in said flexural mode in response to an electric input signal applied thereto, and
  (e) support means fixed to said rigid peripheral portion at said hinge portion so that said driven radiating portion vibrates only about said nodal circle.

2. The invention defined in claim 1 wherein said grooves are of substantially equal depth so that said driven radiating plate portion has uniform stress levels on opposite sides of the said neutral axis thereof when vibrated.

3. The invention defined in claim 1 wherein said electromechanical means includes a piezoelectric ceramic disk fixed to a face of said radiating plate portion, and means for applying an alternating electrical potential to said piezoelectric ceramic disk to alternately bend said radiating plate portion and said piezoelectric ceramic disk in one direction and then in the other direction in accordance with the polarity and amplitude of the applied alternating potential.

4. The invention defined in claim 1 wherein said electromechanical translating means includes a first piezoelectric ceramic disk fixed to one face of said driven radiating plate portion and a second piezoelectric element fixed to the other face of said driven radiating plate portion, each of said piezoelectric ceramic disks having a pair of electrical terminals for applying an alternating potential thereto, each of said piezoelectric ceramic disks being responsive to an alternating potential applied to said terminals to alternately bend said radiating portion and said disks in one direction and then in the other direction in accordance with the polarity and amplitude of the applied alternating potential.

5. The invention defined in claim 1 further including a piston coupler coaxially connected to said driven radiating plate portion for translating flexural vibrations from said driven radiating plate portion into axial vibration of said piston coupler.

6. The invention defined in claim 5 wherein said piston coupler has a smaller driven radiating surface than said radiating plate portion.

7. The invention defined in claim 5 wherein said piston coupler has a smaller driven radiating surface than said radiating plate portion.

References Cited
UNITED STATES PATENTS

| | | | |
|---|---|---|---|
| 3,202,962 | 8/1965 | Elston | 310—9.1 |
| 3,148,677 | 9/1964 | Smith | 310  9.1 |
| 2,845,072 | 7/1958 | Shafer | 128—303 |
| 3,093,760 | 6/1963 | Tarasevich | 310—9.1 |
| 2,161,980 | 6/1939 | Runge | 310—8.2 |
| 2,448,365 | 8/1948 | Gillespie | 340—10 |
| 2,454,264 | 11/1948 | Stigter | 340—10 |
| 2,498,737 | 2/1950 | Holden | 310—9.6 |
| 2,517,975 | 8/1950 | Chapin | 175—183 |
| 2,956,184 | 10/1960 | Pollack | 310—8.2 |
| 2,967,957 | 1/1961 | Massa | 340—10 |
| 3,002,179 | 9/1961 | Kuester | 340—10 |
| 3,113,288 | 12/1963 | Snavely | 340—10 |

MILTON O. HIRSHFIELD, *Primary Examiner.*

J. D. MILLER, *Assistant Examiner.*